United States Patent Office 3,331,659
Patented July 18, 1967

3,331,659
PROCESS FOR PRODUCING LEAD
TITANATE POWDER
Frank Malloy, Trenton, N.J., assignor to the United States of America as represented by the Secretary of the Army
No Drawing. Filed Mar. 31, 1964, Ser. No. 356,325
3 Claims. (Cl. 23—51)

ABSTRACT OF THE DISCLOSURE

A method is provided for preparing lead titanate powders which are homogeneous, of high purity, and of fine particle size. The method involves reacting a lower alkyl titanate with a lead salt of a lower aliphatic fatty acid and with a sufficient quantity of a compound that will assure complete dealkoxylation of the titanium ester in a non-polar organic solvent.

---

The invention described herein may be manufactured and used by or for the Government for governmental purposes without the payment of any royalty thereon.

This invention relates to a method of making lead titanate powder which is homogeneous, of high purity, and of fine particle size and to lead titanate powder so made.

An object of the invention is to provide a method of making lead titanate powder that will be suitable for use in acoustical-electronic applications such as sonar, phonograph pickups, and ultrasonic cleaners, and in dielectric-electronic applications such as delay lines, fusing devices, frequency controlling devices, and resonators for filters.

According to the invention, a lower alkyl titanate is reacted with a lead salt of a lower aliphatic fatty acid and with a sufficient quantity of a compound that will assure complete dealkoxylation of the titanium ester at a temperature of 120 to 170° C. in a non-polar organic solvent. The powders formed are then separated by filtration and the lead titanate powder washed with carbon tetrachloride. The lead titanate powder is then air dried and heated to 200° C. in an atmosphere containing water vapor to remove residual organic matter.

By the term lower alkyl titanate as used herein is meant a compound of the general formula Ti(OR)₄ wherein R is an alkyl radical having up to 5 carbon atoms. The use of butyl titanate or isopropyl titanate as the lower alkyl titanate reactant is preferred.

By the term a lead salt of a lower aliphatic fatty acid is meant a compound of the general formula

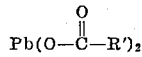

wherein R' may be hydrogen or an alkyl radical having up to 5 carbon atoms. The use of lead acetate or lead formate as the lead salt reactant is preferred.

As the compound used to assure complete dealkoxylation of the titanium ester, we prefer to use acetic acid or acetic anhydride.

Any of the conventional non-polar organic solvents can be used as the medium for the reaction. The use of a relatively high boiling petroleum solvent such as kerosene however, is preferred.

The following example illustrates a particularly desirable embodiment of the invention.

Example

Butyl titanate is reacted with lead formate and acetic acid according to the reaction

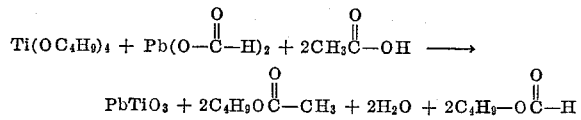

Proper amounts of the reactants are placed in a reaction flask containing kerosene and equipped with a stirrer and a still head to remove the volatile esters that form as by-products of the decomposition. The concentration of reactants in the flask is about one-half mole per liter of total contents in the flask. The butyl titanate is soluble in the kerosene but the lead formate is present in a suspension. The contents of the flask are slowly heated up to 120° C. At that point, the reaction proceeds and the temperature is gradually brought up to 170° C. over a period of 3 to 4 hours. The powders formed in the reaction are separated by filtration on a Büchner funnel, washed free of kerosene with carbon tetrachloride, and air dried. Any residual organic matter still contained by the lead titanate powder is removed by heating to 200° C. in an atmosphere containing water vapor. X-ray diffraction measurements indicate the final product to be lead titanate. Wet chemical analysis demonstrates the material to be consistently within 1 mole percent of being stoichiometric. Electron microscope determinations indicate the lead titanate powder to have a uniform particle size of about 0.01 micron. The lead titanate powder is further homogeneous in that only powder of the single phase (PbTiO₃) is present.

The absence in the method of cations other than lead and titanium assures the purity of the end product. The method is further advantageous in that it is relatively easy to carry out, economic, and not limited by rigorous control and extensive processing in obtaining the final product. Moreover, the method can be adapted to the preparation of other valuable ceramic materials such as lead zirconate and a solid solution of lead zirconate-lead titanate.

The foregoing description is to be considered merely as illustrative of the invention and not in limitation thereof.

What is claimed is:
1. The method of making a homogeneous lead titanate powder of high purity and fine particle size comprising reacting a lower alkyl titanate of the general formula Ti(OR)₄ wherein R is an alkyl radical having not more than five carbon atoms with a lead salt of a lower aliphatic fatty acid of the general formula

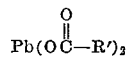

wherein R' is a member of the group consisting of hydrogen and an alkyl radical having not more than five carbon atoms and with a sufficient quantity of a compound that will assure complete dealkoxylation of the titanium ester and selected from the group consisting of acetic acid and acetic anhydride, at a temperature of 120 to 170° C. in a non-polar organic solvent, separating the powders formed by filtration, washing the lead titanate powder with carbon tetrachloride, air drying the lead titanate powder, and heating the lead titanate powder to 200° C. in an atmosphere containing water vapor to remove residual organic matter.

2. The method according to claim 1 wherein the lower alkyl titanate is butyl titanate, the lead salt is lead formate, the compound that will assure complete dealkoxylation of the titanium ester is acetic acid and the non-polar organic solvent is kerosene.

3. The method according to claim 1 wherein the lower alkyl titanate is isopropyl titanate, the lead salt is lead acetate, the compound that will assure complete dealkoxylation of the titanium ester is acetic anhydride and the non-polar organic solvent is kerosene.

References Cited

UNITED STATES PATENTS

| | | | |
|---|---|---|---|
| 2,213,542 | 9/1940 | Booge | 23—51 X |
| 2,607,659 | 8/1952 | Rummery | 23—51 |
| 2,974,008 | 3/1961 | Howatt | 23—51 |
| 3,292,994 | 12/1966 | Kiss et al. | 23—51 |

OSCAR R. VERTIZ, *Primary Examiner.*

H. T. CARTER, *Assistant Examiner.*